United States Patent
Jeong et al.

(10) Patent No.: US 8,154,775 B2
(45) Date of Patent: Apr. 10, 2012

(54) BOOK SCANNER USING THE DIGITAL CAMERA

(76) Inventors: Seung-Tae Jeong, Seongnam-si (KR); Myung-Soo Choi, Goyang-si (KR)

( * ) Notice: Subject to any disclaimer, the term of this patent is extended or adjusted under 35 U.S.C. 154(b) by 500 days.

(21) Appl. No.: 12/516,926

(22) PCT Filed: Nov. 26, 2007

(86) PCT No.: PCT/KR2007/005977
§ 371 (c)(1),
(2), (4) Date: May 29, 2009

(87) PCT Pub. No.: WO2008/066291
PCT Pub. Date: Jun. 5, 2008

(65) Prior Publication Data
US 2010/0067068 A1    Mar. 18, 2010

(30) Foreign Application Priority Data

Dec. 1, 2006 (KR) .................. 10-2006-0120380

(51) Int. Cl.
*H04N 1/04* (2006.01)

(52) U.S. Cl. ........ 358/474; 358/488; 358/497; 358/482; 348/262; 348/370; 399/211

(58) Field of Classification Search ............ 358/474, 358/488, 497, 408, 475, 471, 482, 498; 348/262, 348/207.99, 222.1, 370; 399/211
See application file for complete search history.

(56) References Cited

U.S. PATENT DOCUMENTS

| 5,760,925 A * | 6/1998 | Saund et al. ........... 358/497 |
| 5,835,241 A * | 11/1998 | Saund ............... 358/488 |
| 5,847,846 A | 12/1998 | Wu et al. |
| 7,800,788 B2 * | 9/2010 | Yazawa et al. .......... 358/474 |
| 2003/0172795 A1 * | 9/2003 | Belkhir ............... 84/486 |
| 2005/0243386 A1 * | 11/2005 | Sheng .............. 358/506 |

(Continued)

FOREIGN PATENT DOCUMENTS

JP    09-294182    11/1997

(Continued)

OTHER PUBLICATIONS

International Search Report for PCT/KR2007/005977 dated Feb. 20, 2008.

*Primary Examiner* — Negussie Worku
(74) *Attorney, Agent, or Firm* — Cantor Colburn LLP

(57) ABSTRACT

The present invention relates to a book scanner using a digital camera, including a main body including a housing opened at a top thereof and having an inner space and a table covering the opened top of the housing, illuminating units disposed in the main body and configured to irradiate light to the table so that left and right images of a book are projected from the table, a digital camera having a lens disposed from the inside bottom of the housing toward the center of the table and configured to capture images of the left and right pages of the book, fixed mirrors disposed on the left and right sides of the digital camera at the bottom of the housing and configured to primarily reflect images of the left and right pages of the book toward the digital camera, and a rotating mirror disposed over the digital camera and configured to secondarily reflect images of the left and right pages of the book toward the digital camera selectively while rotating left and right.

21 Claims, 4 Drawing Sheets

U.S. PATENT DOCUMENTS

| | | | |
|---|---|---|---|
| 2006/0026140 A1* | 2/2006 | King et al. | 707/3 |
| 2006/0215236 A1* | 9/2006 | Itoi | 358/474 |
| 2007/0216963 A1* | 9/2007 | Horvath et al. | 358/474 |
| 2010/0123941 A1* | 5/2010 | Albahri | 358/474 |
| 2010/0157381 A1* | 6/2010 | Chen | 358/449 |

FOREIGN PATENT DOCUMENTS

| | | |
|---|---|---|
| KR | 20-2000-0021084 | 12/2000 |
| KR | 10-2005-0056411 | 6/2005 |

\* cited by examiner

[Fig. 1]
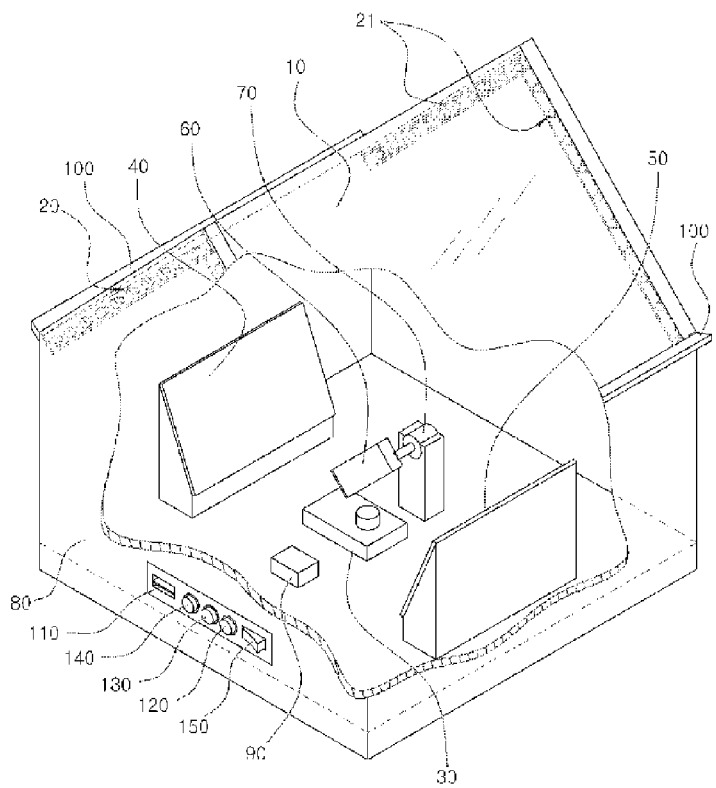
[Fig. 2]
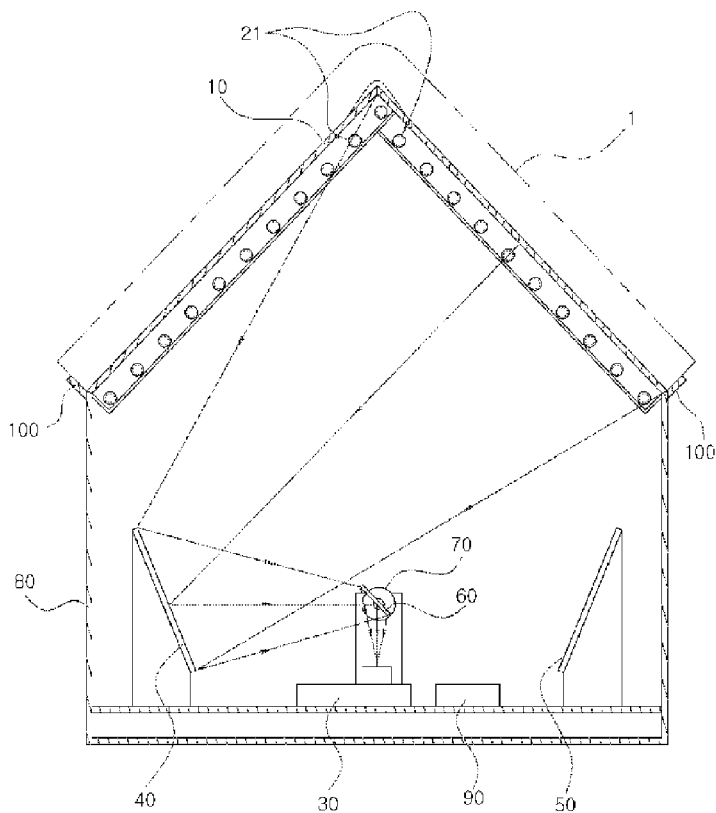

[Fig. 3]
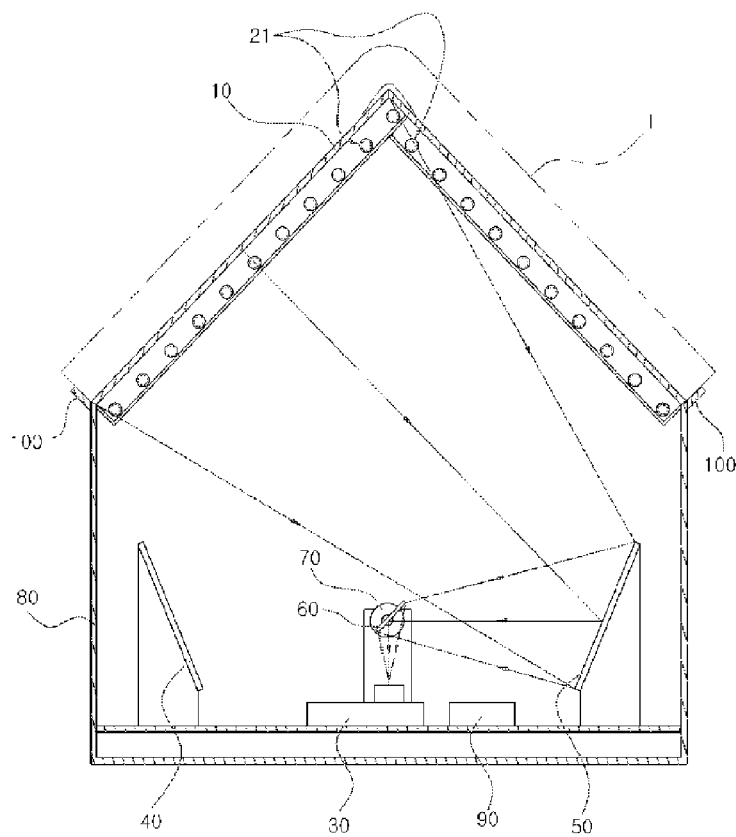
[Fig. 4]
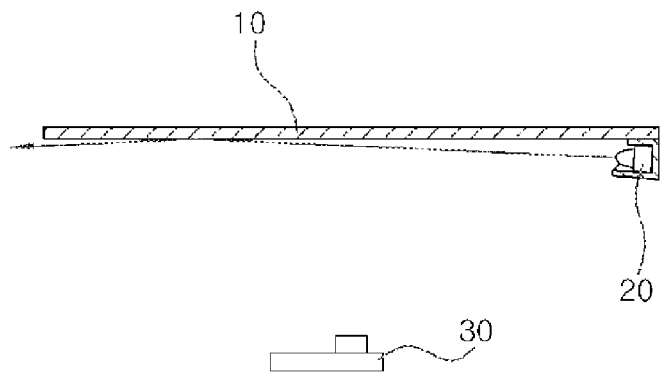
[Fig. 5]
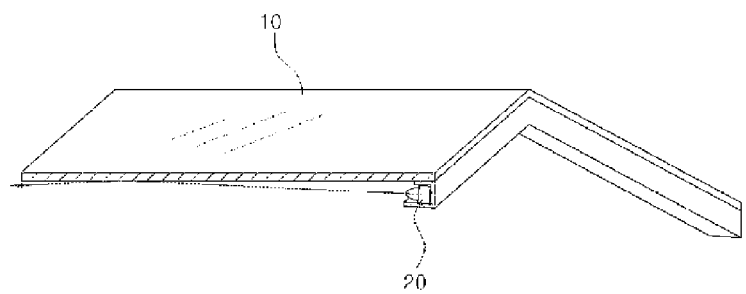

[Fig. 6]
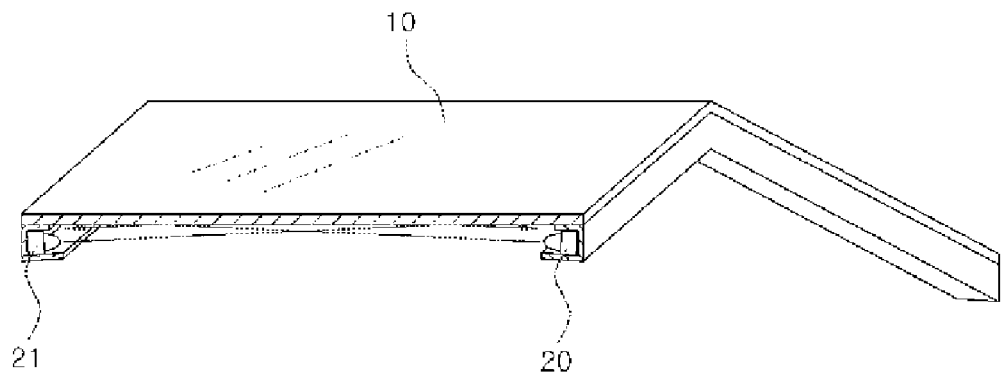
[Fig. 7]
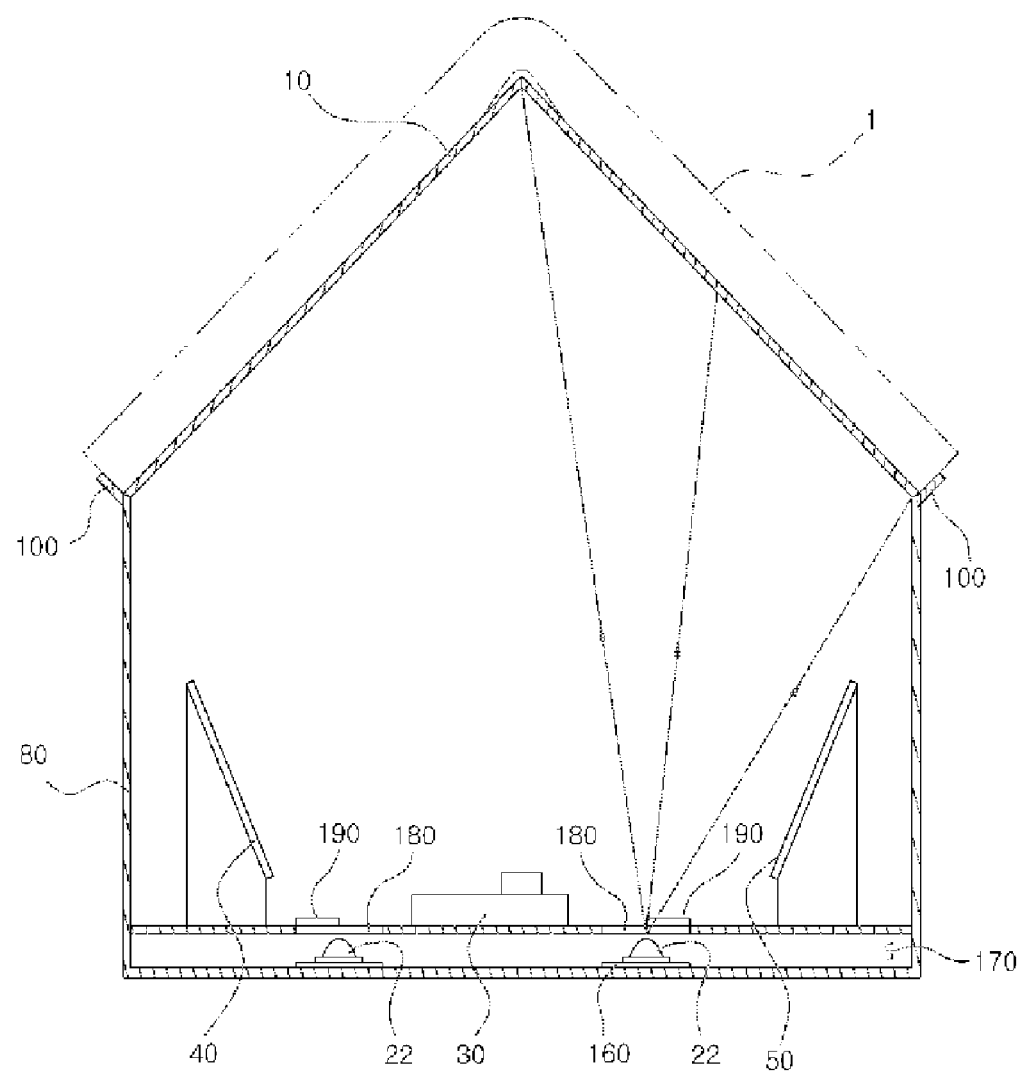

[Fig. 8]
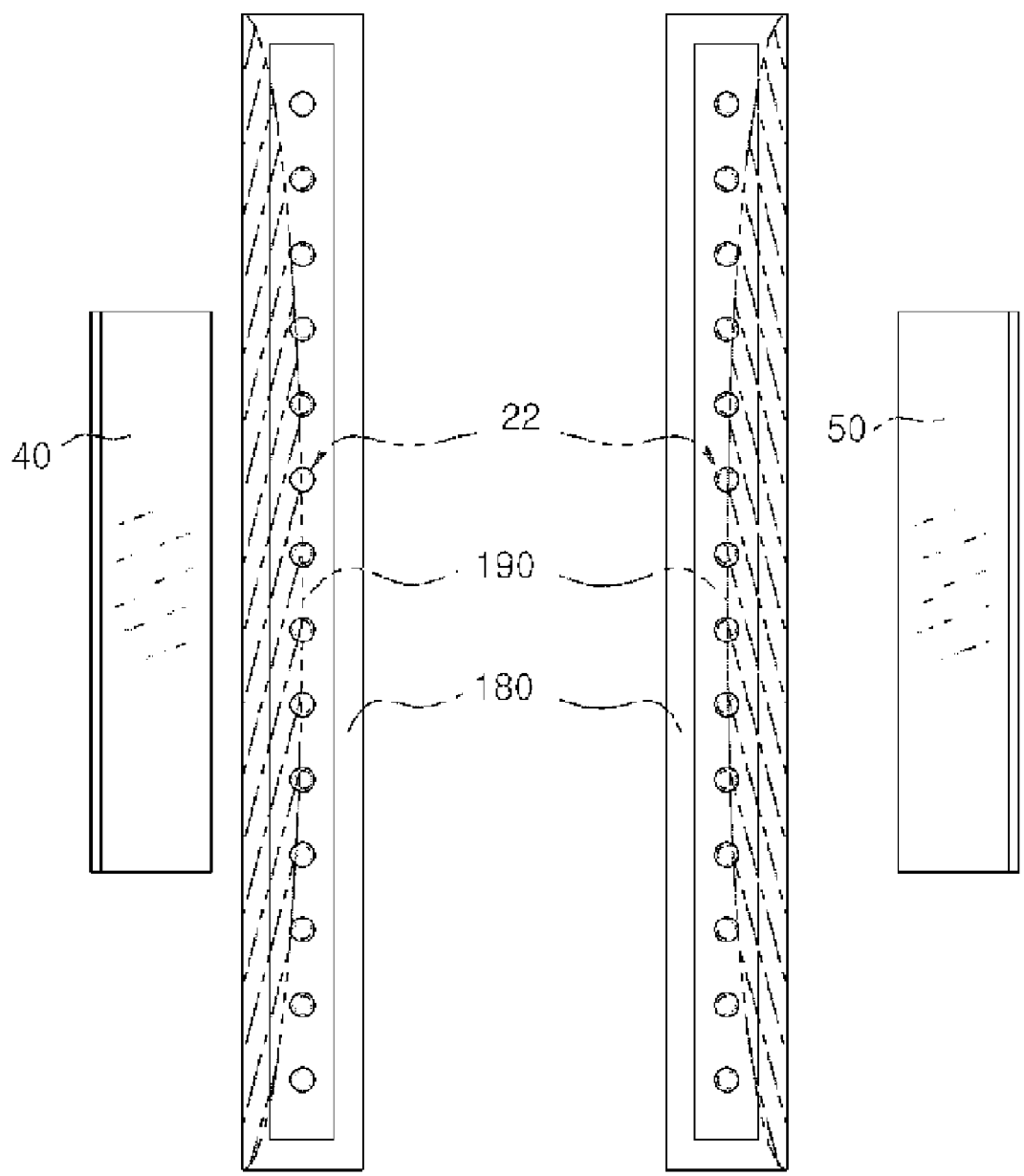

BOOK SCANNER USING THE DIGITAL CAMERA

TECHNICAL FIELD

The present invention relates to a book scanner using a digital camera, and more particularly, to a book scanner, which scans pages at the inside of a book using a digital camera so that scanning can be performed rapidly despite an increase in resolution, and it can selectively scan only the left or right page of the book smoothly and sequentially scan the left and right pages of the book sequentially.

BACKGROUND ART

In general, a scanner is adapted to scan figures, characters, etc., which are printed on a paper sheet, so that they can be stored in a recording medium, such as a hard disk or CD of a computer and flash memory, or displayed on a screen or a display through a projector, a computer or the like.

In such a scanner, a scanning head having an image sensor is adapted to scan objects such as characters and/or figures printed on a printed matter, such as a book placed on a transparent table, while moving under the table. Thus, the existing scanner is problematic in that the scanning speed is slow due to the time consumed to move the scanning head. Furthermore, the existing scanner is disadvantageous in that the time taken to move the scanning head is lengthened as the resolution is increased.

Further, the existing scanner has a great difficulty in scanning the inside pages of the book. This is because scanning is performed smoothly when a paper sheet on which figures, characters, etc. are printed is closely adhered to the transparent table, but a book is bound and therefore has its central portion not closely adhered to the table.

To solve this problem, Korean Patent Application No. 10-2003-0089421 (Unexamined Patent Publication No. 10-2005-0056411) discloses a book scanner for scanning a book effectively by forming a table in an acute-angular shape defined by two adjacent rectangular faces of a roof of a general house, so that left and right pages of an opened book can be conformingly seated the acute-angular shaped table.

However, the above book scanner is also problematic in that scanning is not performed rapidly due to slow scanning speed by a scanning head having an image sensor. Further, the above book scanner is disadvantageous in that the left and right pages of a book cannot be selectively scanned.

DISCLOSURE OF INVENTION

Technical Problem

Accordingly, the present invention has been made in view of the above problems occurring in the prior art, and an object of the present invention is to provide a book scanner, which can perform scanning rapidly despite an increase in resolution, and scan the left/right pages of a book selectively and sequentially.

Technical Solution

To achieve the above objects, the present invention provides a book scanner using a digital camera, including a main body, including a housing opened at a top thereof and having an inner space, and a table made of a transparent material and disposed to cover the opened top of the housing, wherein the table provides a place on which a book to be scanned is unfolded; illuminating units disposed in the main body and configured to irradiate light to the table so that images of left and right pages of the book can be projected from the table; a digital camera mounted on an inside bottom of the housing and having a lens installed thereon in such manner as to be oriented toward the center of the table from the inside bottom of the housing, the digital camera being configured to capture and scan left and right images of the book, using the light emitted from the illuminating units; fixed mirrors disposed on left and right sides of the digital camera, respectively, at the inside bottom of the housing and disposed under the table, wherein the fixed minors are configured to primarily reflect images of the left and right pages of the book, which are projected from the table, toward the digital camera; and a rotating mirror supported by a support member, which stands upright at the inside bottom of the housing, and disposed over the digital camera, wherein the rotating mirror is configured to secondarily reflect images of the left and right pages of the book, which are reflected from the fixed mirrors, toward the digital camera selectively while rotating left and right according to external manipulation so that the digital camera can scan the book.

The table may comprise a sheet shape having its left and right portions bent relative to a longitudinal central line thereof in the same acute-angular shape as defined by two adjacent rectangular faces of a tricapped trigonal prism so that the inside pages of an opened book is conformingly in close contact with the top surface of the table effectively.

The illuminating units may be disposed under the left and right portions of the table, respectively, and irradiate light along the bottom surface of the left and right portions of the table.

The illuminating units may be disposed under an edge of one of the left and right portions of the table and irradiate light to an edge of the other of the left and right portions of the table.

The illuminating units may be disposed opposite to each other under edges of the left and right portions of the table and irradiate the light toward each other.

The illuminating units may be arranged in plural numbers along the length of the edges.

The book scanner may further include one closed space under the bottom of the housing, wherein the illuminating units are disposed within the closed space and irradiate the light to the table upwardly from the closed space.

The illuminating units may be divided into two sections in order to irradiate light to the left and right portions of the table, respectively.

The book scanner may further include a transparent window mounted on the closed space through which the light of the illuminating units passes, for allowing the light of the illuminating units to pass therethrough, and a semi-transparent window mounted on the transparent window, for allowing an illumination intensity of light to be made uniform therethrough.

The illuminating units may be arranged in plural numbers along the length of the transparent window.

The semi-transparent window may have an arc shape and is disposed on one side of the transparent window, the semi-transparent window being configured to differentially cover the arrangement of the illuminating units in order to shield light.

The semi-transparent window may include a semi-transparent film paper.

The illuminating units may include a light emitting diode (LED).

The fixed mirrors may have their reflection surfaces obliquely disposed toward the table so that the fixed mirrors face each other, and reflect any one of images of the left and right pages of the book opposite to the reflection surfaces toward the digital camera.

The table may be detachably installed to the housing.

The table has a stopper protrudingly formed along the edges thereof for supporting the book placed on the table in order to prevent the book from slipping down.

The rotating mirror may be rotated by a motor disposed in the support member.

An illuminometer is further disposed at the inside bottom of the housing for controlling the digital camera to sequentially scan images of the left and right pages of the book, starting with one side, when a measured illumination intensity is less than a preset value.

The housing may include a power supply switch for applying external power to the constituent elements, a connection jack for connecting a cable for transmitting the image of the book, which is captured by the digital camera, so that the image can be stored in a computer or an additional recording medium or displayed on a computer, a scanning switch for controlling an operation of the motor, and an automatic scanning switch for controlling the constituent elements so that the images of the book can be scanned sequentially through the illuminometer.

Advantageous Effects

The present invention has an advantage in that scanning can be performed rapidly although the resolution is increased since the pages inside of a book is scanned through a digital camera.

Further, a table on which a book is placed is formed in a triangle, and the left and right fixed mirrors for condensing images projected from left and right portions of the book and reflecting the images toward a digital camera, and the rotating mirror for forming the reflected images on the digital camera are provided. Accordingly, there are advantages in that the left and right pages of a book can be scanned selectively and both sides of a book can be scanned sequentially.

BRIEF DESCRIPTION OF THE DRAWINGS

Further objects and advantages of the invention can be more fully understood from the following detailed description taken in conjunction with the accompanying drawings in which:

FIG. 1 is a perspective view of a book scanner using a digital camera, which is partially cut so that an internal structure of the book scanner can be seen, according to the present invention;

FIG. 2 is a view showing a process of scanning the right page of a book in the present invention;

FIG. 3 is a view showing a process of scanning the left page of a book in the present invention;

FIGS. 4 and 5 are views showing examples in which illuminating unit is installed in the present invention;

FIG. 6 is a view showing another example in which the illuminating unit is installed in the present invention;

FIG. 7 is a view showing a modified example of the book scanner using a digital camera according to the present invention; and FIG. 8 is a view showing only the arrangement of the illuminating units of FIG. 7.

DESCRIPTION OF REFERENCE NUMERALS OF PRINCIPAL ELEMENTS IN THE DRAWINGS

1: book 10: table
20, 21,22: illuminating unit 30: digital camera
40: left fixed mirror 50: right fixed mirror
60: rotating mirror 70: motor
80: housing 90: illuminometer
100: stopper 110: connection jack
120: right scanning switch 130: left scanning switch
140: an automatic scanning switch
150: power supply switch 170: closed space
180: transparent window 190: semi-transparent window

MODE FOR THE INVENTION

The present invention will now be described in detail in connection with specific embodiments with reference to the accompanying drawings.

FIG. 1 is a perspective view of a book scanner using a digital camera, which is partially cut so that an internal structure of the book scanner can be seen, according to the present invention. FIG. 2 is a view showing a process of scanning the right page of a book in the present invention. FIG. 3 is a view showing a process of scanning the left page of a book in the present invention. FIGS. 4 and 5 are views showing examples in which an illuminating unit is installed in the present invention. FIG. 6 is a view showing another example in which the illuminating unit is installed in the present invention. FIG. 7 is a view showing a modified example of the book scanner using a digital camera according to the present invention. FIG. 8 is a view showing only the arrangement of the illuminating unit of FIG. 7.

The book scanner using a digital camera according to the present invention includes a housing 80 having a space whose top is opened therein.

The housing 80 may be made of a material through which light cannot pass. The opened top of the housing 80 is covered with a table 10, thus forming a main body.

The table 10 is made of a transparent material such as glass. The table 10 is of a bent sheet shape having its left and right portions curved relative to a longitudinal central line thereof in the same acute-angular shape as defined by two adjacent rectangular faces of a tricapped trigonal prism so that the inside pages of an opened book is conformingly in close contact with the top surface of the table 10 effectively.

This table 10 is detachably installed to the housing 80 so that the following constituent elements mounted within the housing 80 can be replaced and maintained easily.

Illuminating units 20, 21 for irradiating light along the bottom surface of the table 10 are disposed under the table 10. The illuminating units 20, 21 are described later on.

The present invention has its object to perform scanning rapidly although the resolution is increased. This is because in the existing scanner, a long time is taken to move a scanning head having an image sensor.

To this end, according to the present invention, scanning is performed using a digital camera 30. That is, an image of a book 1 placed on the table 10 is formed on the lens of the digital camera 30, and the digital camera 30 captures the formed image for scanning. Thus, scanning can be carried out rapidly although scanning is performed while increasing the resolution.

Furthermore, according to the present invention, even though only one digital camera 30 is included, both the left and right pages of the book 1 can be scanned. Accordingly, the scanner can be prevented from becoming bulky and therefore the manufacturing cost can be low.

The digital camera 30 has its lens disposed from the inside bottom of the housing 80 toward the center of the table 10.

Furthermore, as shown in FIG. 2, a left fixed minor 40 is disposed on the left side of the digital camera 30.

The left fixed minor 40 is disposed on the left side of the digital camera 30 at the bottom of the housing 80 and is disposed under the left side of the table 10.

The left fixed minor 40 disposed as described above reflects primarily in an image of a right page of the book 1, which is projected through the right side of the table 10, which is opposite to the left fixed mirror 40, toward the digital camera 30.

Furthermore, as shown in FIG. 3, a right fixed mirror 50 is disposed on the right side of the digital camera 30.

The right fixed minor 50 is disposed on the right side of the digital camera 30 at the bottom of the housing 80 and is disposed under the right side of the table 10.

The right fixed minor 50 reflects primarily an image of the left page of the book 1, which is projected through the left side of the table 10, which is opposite to the right fixed mirror 40, toward the digital camera 30.

In this structure, although the image of the book 1, which is reflected from the left fixed mirror 40 or the right fixed mirror 50, is directed toward the digital camera 30, the image is not formed on the lens directed toward the table 10.

For this reason, the present invention includes a rotating mirror 60. The rotating mirror 60 is disposed obliquely over the digital camera 30. The rotating mirror 60 is adapted to rotate its reflection surface left and right so that the image reflected from the left fixed mirror 40 and the image reflected from the right fixed mirror 50 are secondarily reflected toward the lens of the digital camera 30 selectively and then formed on the lens.

The left fixed minor 40, the right fixed mirror 50 and the rotating minor 60 function to form an image by reflecting light like a mirror. The position and tilt angle of the rotating minor 60 may be varied according to an angle of the center of the table 10 (a curved angle), a distance between the lens of the digital camera 30 and the center of the table 10, and the positions of the minors 40, 50.

The rotating minor 60 can form the image of the book 1 on the lens of the digital camera 30 only when it is disposed obliquely as described above.

The image reflected from the left fixed mirror 40 and the image reflected from the right fixed mirror 50 are formed on the lens of the digital camera 30 according to the rotation direction of the rotating mirror 60.

The left and right rotations of the rotating minor 60 are performed by a motor 70.

That is, the motor 70 is disposed in a support member (not designated by a reference numeral), which is disposed at the inside bottom of the housing 80 in an upright position, and is connected to the rotating minor 60, thus rotating the rotating mirror 60 left and right.

The motor 70 may be a forward/reverse motor. The support member supports the motor 70 so that the rotating mirror 60 can be positioned over the digital camera 30.

Thus, if the reflection surface of the rotating minor 60 is directed toward the left side through the driving of the motor 70 as shown in FIG. 2, an image of the right page of the book 1, which is reflected from the left fixed minor 40 and then projected through the right side of the table 10, is formed on the lens of the digital camera 30.

On the other hand, if the reflection surface of the rotating mirror 60 is directed toward the right side through the driving of the motor 70 as shown in FIG. 3, an image of the left page of the book 1, which is reflected from the right fixed minor 50 and then projected through the right side of the table 10, is formed on the lens of the digital camera 30.

Meanwhile, the illuminating units 20, 21 may be disposed under the left and right portions of the table 10, respectively, and irradiate light along the bottom surfaces of the left and right portions, so that the lens of the digital camera 30 can scan the images projected from the table 10 normally.

In other words, the illuminating units 20 may be disposed under the edge of one of the left and right portions of the table 10 as shown in FIGS. 4 and 5, and may irradiate light to the edge of the other of the left and right portions. Thus, although the light is reflected from the table 10, it is not irradiated toward the digital camera 30, so that the digital camera 30 can scan the image projected from the table 10 normally.

The illuminating units 21 may be disposed under the edge of one of the left and right portions of the table 10 so that they are opposite to the illuminating units 20 as shown in FIG. 6. Accordingly, a uniform illuminating effect can be obtained together with the illuminating units 20.

The illuminating units 20, 21 may employ any one of a fluorescent lamp, an electric light and a light emitting diode. When an electric light or a light emitting diode is used, it can be arranged in plural numbers along the length of the edge.

Hereinafter, an operation principle of the present invention is described.

If the book 1 is opened, turned over and then placed on the table 10 as shown in FIG. 2, the inside of the book touches the table 10 smoothly.

In this state, if the rotating mirror 60 is rotated left as the motor 70 is driven, it becomes a state where the image of the book 1, which is projected from the right side of the table 10, can be scanned.

In other words, an image of the right page of the book 1 projected from the right side of the table 10 is reflected from the left fixed mirror 40 and then sent to the rotating mirror 60. The rotating minor 60 reflects the image back to the lens of the digital camera 30. It becomes a state where an image of the right page of the book 1 can be scanned.

Further, as shown in FIG. 3, if the rotating minor 60 is rotated right as the motor 70 is driven with the book 1 being placed on the table 10, it becomes a state where the image of the book 1, which is projected from the left side of the table 10, can be scanned.

In other words, an image of the left page of the book 1 projected from the left side of the table 10 is reflected from the right fixed mirror 50 and then sent to the rotating mirror 60. The rotating mirror 60 reflects the image back to the lens of the digital camera 30. It becomes a state where an image of the left page of the book 1 can be scanned.

If the image is formed on the lens of the digital camera 30 as described above, the digital camera 30 is driven to capture the formed image, so a scanning task is completed.

Thereafter, the digital camera 30 sends the scanned image file to a recording medium or a computer in order to store or display the image file through a window.

Meanwhile, the present invention is adapted to perform scanning automatically by sensing that the book 1 is placed on the table 10. This is accomplished by an illumination meter 90 disposed at the inside bottom of the housing 80 and configured to measure the illumination intensity therein.

That is, according to the present invention, when the illumination intensity measured by the illumination meter 90 has a specific value or less in a state where power is applied to the constituent elements 20, 21, 60 and 70, an image projected from the left side of the table 10 and an image projected from the right side of the table 10 are sequentially scanned.

If the book 1 or paper is placed on the table 10, light is precluded from entering the housing 80 and therefore the inside of the housing 80 becomes dark. The above technique employs this phenomenon.

The above technique for performing scanning when the illumination intensity measured by the illumination meter 90 has a specific value or less may be implemented by a method of controlling the respective constituent elements using additional control means, a method of arranging lines so that whether to apply power is determined or the like.

The method of allowing a specific constituent element to perform a specific operation according to the illumination intensity measured by the illumination meter 90 as described above is well known and description thereof is omitted.

The present invention further includes a stopper 100 for supporting the book 1, paper, etc., which is placed on the table 10, so that the book 1, paper, etc. does not slip down.

In other words, in the case of a book, when one side of an opened book is heavier than the other side of the opened book, the book slips toward the heavy side. If the book is caught by the hands, the book placed on the table 10 becomes a unstable state.

Further, the table 10 has a triangle and a sheet of paper cannot be placed on the table 10 stably.

For this reason, there is a need for the stopper 100 for supporting a book, paper, etc., which is placed on the table 10, so that the book, paper, etc. does not slip down.

The stopper 100 is projected from the left and right edges of the table 10 and performs the above function.

The present invention further includes a control panel section disposed at the front of the housing 80.

The control panel section is equipped with a connection jack 110 for connecting a cable for transmitting an image of the book 1, which is captured by the digital camera 30, so that the image can be stored in a recording medium or displayed on a computer.

The control panel section may further include a right scanning switch 120 for controlling the motor 70 to rotate the rotating mirror 60 in a left direction so that the image projected from the right side of the table 10 is scanned.

The control panel section may further include a left scanning switch 130 for controlling the motor 70 to rotate the rotating mirror 60 in a right direction so that the image projected from the left side of the table 10 is scanned.

The control panel section may further include an automatic scanning switch 140 for controlling the motor 70 to rotate the rotating mirror 60 in the left and right directions sequentially so that an image generated from the left side of the table 10 and an image generated from the right side of the table 10 are sequentially scanned.

In other words, the left scanning switch 130 controls the rotating mirror 60 so that only the left side of the table 10 is scanned, and the right scanning switch 120 controls the rotating mirror 60 so that only the right side of the table 10 is scanned. Unlike the above, the automatic scanning switch 140 controls the rotating mirror 60 so that the left and right sides of the table 10 are scanned sequentially.

The control panel section may further include a power supply switch 150 for applying external power to the constituent elements.

Meanwhile, the present invention further includes one closed space 170 at the bottom of the housing 80, as shown in FIGS. 7 and 8. Illuminating units 22 may be disposed within the closed space 170.

The illuminating units 22 irradiate light to the table 10 upwardly from the closed space 170. In this case, the illuminating units 20, 21 may be omitted.

The closed space 170 has a transparent window 180 on its top so that the illuminating units 22 irradiate light to the table 10 through the transparent window 180. A semi-transparent window 190 is disposed on the transparent window 180 in order to make uniform the illumination intensity of light.

The illuminating units 22 may be preferably arranged in plural numbers along the length of the transparent window 180 as a light emitting diode. The semi-transparent window 190 has an arc shape and is disposed on one side of the transparent window 180. The semi-transparent window 190 differentially covers the arrangement of the illuminating units 22, thus making uniform the illumination intensity of light.

That is, the illuminating units 22 located at central portions of the arrangement are higher in the illumination intensity than the illuminating units 22 located at other places. To obtain a uniform resolution, it is necessary to control the illumination intensity of the illuminating units 22.

To this end, as shown in FIG. 8, the semi-transparent window 190 has an arc shape so that it can cover half (50%) or more the illuminating units 22 located at the central portions of the arrangement and gradually less cover the illuminating units 22 towards its upper and lower ends of the arrangement, thus accomplishing a uniform illumination intensity. The semi-transparent window 190 may employ a semi-transparent glass sheet or a semi-transparent acrylic sheet. Alternatively, a semi-transparent film paper may be used as the semi-transparent window 190.

INDUSTRIAL APPLICABILITY

The present invention relates to the book scanner using a digital camera. The inside of a book is scanned using a digital camera. Thus, scanning can be performed rapidly despite an increase in resolution during the scanning, only the left or right page of the book can be selectively scanned smoothly, and the left and right pages of the book can be scanned sequentially.

Further, the inside of a book is scanned through the digital camera using the book scanner of the present invention. Accordingly, scanning can be performed rapidly despite an increase in resolution during the scanning.

Moreover, the table has a sheet shape whose left and right portions are bent relative to a longitudinal central line in the same acute-angular shape as defined by two adjacent rectangular faces of a tricapped trigonal prism so that the left and/or right pages of an opened book is conformingly in close contact with the top surface of the table effectively in order for the book to be scanned using the digital camera. The left and right fixed minors for reflecting images generated from the left and right sides of the table toward the digital camera are included. Further, the rotating mirror for forming the reflected images on the lens of the digital camera is included. Accordingly, the image generated from the left side of the table or the image generated from the right side of the table can be scanned selectively, and both the left and right sides of the table can be scanned sequentially.

Although the specific embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A book scanner using a digital camera, comprising: a main body, including a housing opened at a top thereof and having an inner space, and a table made of a transparent material and disposed to cover the opened top of the housing, wherein the table provides a place on which a book to be scanned is unfolded; illuminating units disposed in the main body and configured to irradiate light to the table so that images of left and right pages of the book can be projected from the table; a digital camera mounted on an inside bottom of the housing and having a lens installed thereon in such manner as to be oriented toward the center of the table from the inside bottom of the housing, the digital camera being configured to capture and scan left and right images of the book, using the light emitted from the illuminating units; fixed mirrors disposed on left and right sides of the digital camera, respectively, at the inside bottom of the housing and disposed under the table, wherein the fixed mirrors are configured to primarily reflect images of the left and right pages of the book, which are projected from the table, toward the digital camera; and a rotating mirror supported by a support member, which stands upright at the inside bottom of the housing, and disposed over the digital camera, wherein the rotating mirror is configured to secondarily reflect images of the left and right pages of the book, which are reflected from the fixed mirrors, toward the digital camera selectively while rotating left and right according to external manipulation so that the digital camera can scan the book.

2. The book scanner of claim 1, wherein the table includes a sheet shape whose left and right portions are curved in a triangle on the basis of its center so that the book can be unfolded on the left and right portions.

3. The hook scanner of claim 2, wherein the illuminating units are disposed under the left and right portions of the table, respectively, and irradiate light along the bottom surface of the left and right portions of the table.

4. The book scanner of claim 3, wherein the illuminating units are disposed under an edge of one of the left and right portions of the table and irradiate light to an edge of the other of the left and right portions of the table.

5. The hook scanner of claim 4, wherein the illuminating units are arranged in plural numbers along the length of the edges.

6. The hook scanner of claim 3, wherein the illuminating units are disposed opposite to each other under edges of the left and right portions of the table and irradiate the light toward each other.

7. The book scanner of claim 6, wherein the illuminating units are arranged in plural numbers along the length of the edges.

8. The hook scanner of claim 2, further comprising one closed space under the bottom of the housing, wherein the illuminating units are disposed within the closed space and irradiate the light to the table upwardly from the closed space.

9. The book scanner of claim 8, wherein the illuminating units are divided into two sections in order to irradiate light to the left and right portions of the table, respectively.

10. The book scanner of claim 9, further comprising: a transparent window mounted on the closed space through which the light of the illuminating units passes, for allowing the light of the illuminating units to pass therethrough, and a semi-transparent window mounted on the transparent window, for allowing an illumination intensity of light to be made uniform therethrough.

11. The book scanner of claim 10, wherein the illuminating units are arranged in plural numbers along the length of the transparent window.

12. The book scanner of claim 11, wherein the semi-transparent window has an arc shape and is disposed on one side of the transparent window, the semi-transparent window being configured to differentially cover the arrangement of the illuminating units in order to shield light.

13. The book scanner of claim 10, wherein the semi-transparent window includes a semi-transparent film paper.

14. The book scanner of claim 1, wherein the fixed mirrors have their reflection surfaces obliquely disposed toward the table so that the fixed mirrors face each other, and reflect any one of images of the left and right pages of the book opposite to the reflection surfaces toward the digital camera.

15. The book scanner of claim 1, wherein the illuminating units comprise a light emitting diode (LED).

16. The book scanner of claim 1, wherein the table is detachably installed to the housing.

17. The book seamier of claim 1, wherein the table has a stopper protrudingly formed along the edges thereof for supporting the book placed on the table in order to prevent the book from slipping down.

18. The book scanner of claim 1, wherein the rotating mirror is rotated by a motor disposed in the support member.

19. The book scanner of claim 18, wherein an illuminometer is further disposed at the inside bottom of the housing for controlling the digital camera to sequentially scan the images of the left and right pages of the book, starting with one side, when a measured illumination intensity is less than a preset value.

20. The book scanner claim 19, wherein the housing further comprises a control panel section disposed at one side thereof, the control panel section comprising: a power supply switch for applying external power to the constituent elements, a connection jack for connecting a cable for transmitting the image of the book, which is captured by the digital camera, so that the image can be stored in a computer or an additional recording medium or displayed on a computer, a scanning switch for controlling an operation of the motor, and an automatic scanning switch for controlling the constituent elements so that the images of the book can be scanned sequentially through the illuminometer.

21. The book scanner of claim 1, wherein the table comprises a sheet shape having its and right portions bent relative to a longitudinal central line thereof in the same acute-angular shape as defined by two adjacent rectangular faces of a tri-capped trigonal prism so that the inside pages of an opened book is conformingly in close contact with the top surface of the table effectively.

* * * * *